United States Patent Office 2,836,173
Patented May 27, 1958

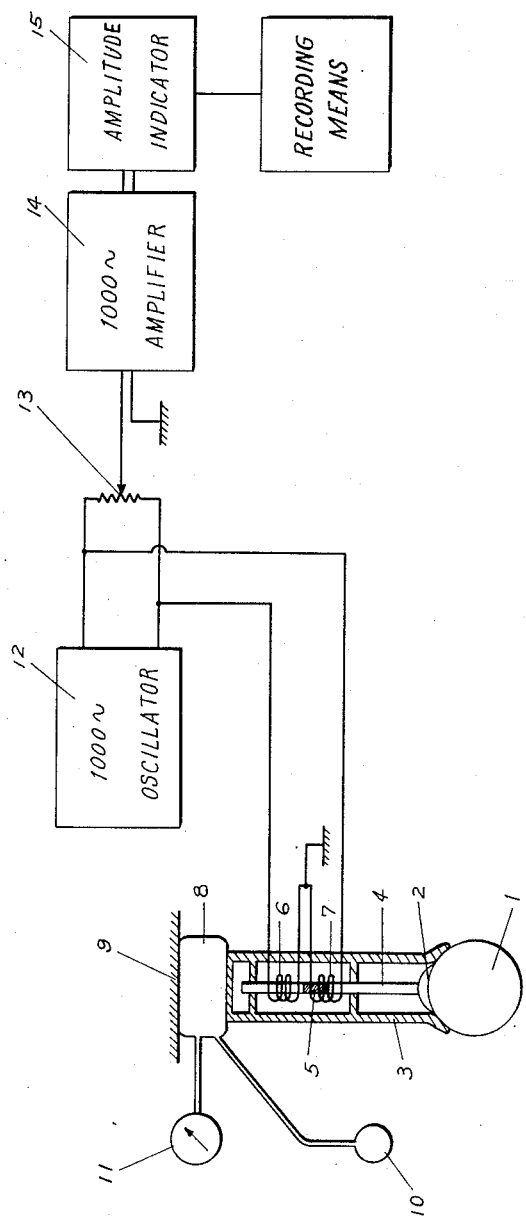

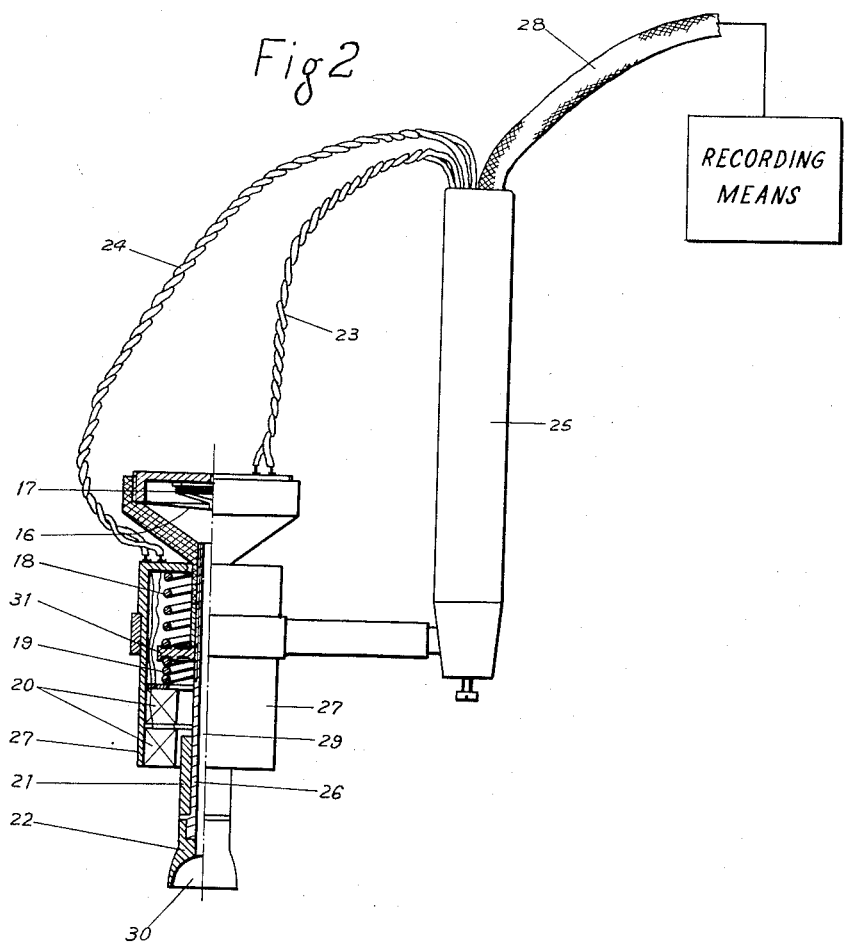

2,836,173

APPARATUS TO MEASURE INTRA-CEREBRAL BLOOD PRESSURE

Misao Uemura and Yoshio Ogino, Tokyo, Japan

Application November 25, 1952, Serial No. 322,442

Claims priority, application Japan November 30, 1951

7 Claims. (Cl. 128—2.05)

This invention relates to an electrical blood pressure measuring device, and in particular, the invention is concerned with an apparatus for the electrical measurement of intra-cerebral blood pressure.

It has, hitherto, been the practice to measure blood pressure at the brachium of the human body. Although the hyperfunction of the heart and the increase in viscosity of blood may be considered as causes of hypertension of blood pressure, these are not, per se, of importance.

The significance of the measurement of blood pressure and the examination of the circulation of blood in the finest blood vessels and capillary vessels is well recognized, and the measurement of the blood pressure in the intra-cerebral blood vessels is an important diagnostic operation. However, the accurate measurement of intra-cerebral blood pressure cannot be attained by the use of ordinary blood pressure measuring apparatus such as that which is used to measure blood pressure at the brachium. For this reason the ordinary blood pressure apparatus is not considered to be reliable in the prognosis of cerebral hemorrhage.

Unsuccessful attempts have hitherto been made in the measurement of intra-cerebral blood pressure and more especially attempts to measure the blood pressure of the cerebro-hemmorhagic artery have not been found satisfactory. It is almost impossible to measure the blood pressure of the intra-cerebral blood vessels directly.

The ophthalmic artery and the cerebral artery are closely related anatomically, and it is known clinically that an abnormality which may occur in the function of intra-cerebral blood vessels results in a corresponding abnormality in the function of blood vessels of the eye.

The object of the present invention is to provide an apparatus for accurately measuring blood pressure of the so-called cerebro-hemorrhagic artery by the use of hydraulic and electrical sensing means to measure the blood pressure of the branches of the ophthalmic artery, more especially, the pulsation and pressure of the central retinal artery.

A a further object of the invention is to provide an instrument to measure intra-cerebral blood pressure by the application of external pressure to the eyeball, and to detect the characteristic pulsations of the central retinal artery and the changes in corneal pulsation upon the application of external pressure to the eyeball, the instrument comprising pressure applying means fitting over the eye, pressure sensing means including pressure-displaceable means arranged to coact with the pulsations of the cornea in the absence of as well as in the presence of external pressure on the eyeball, said pressure sensing means being connected to an electrical sensing means which in combination with an electrical circuit serves to provide a reading on an electrical meter which is proportional to the degree of displacement of the pressure sensing means.

Other and further objects of the present invention will appear from the more detailed description set forth below, it being understood that such detailed description is given by way of illustration and explanation only and not by way of limitation, since various changes therein may be made by those skilled in the art without departing from the scope and spirit of the present invention.

In connection with that more detailed description, there is shown in the drawings, in Fig. 1, a sectional view and circuit diagram illustrating an electronic sensing means for the measurement of corneal pulsations and pressure, and Fig. 2, a sectional view of another mechanical embodiment of the invention wherein the electrical sensing means includes a piezo crystal.

Fig. 1 shows one embodiment of the invention in which is provided pressure applying means in the form of a cylinder 3 for applying external pressure to the eyeball 1, pressure sensing means in the form of a pressure meter for measuring the pressure applied to the said cylinder, and pressure displaceable means in the form of a movable plunger 4 supported in the cylinder. The shaped end of the said plunger abuts the cornea of the eyeball, and the plunger is freely movable in response to the pulsation of the cornea which is caused by the pulsation of the central retinal artery. Two coils 6 and 7 which constitute the electrical sensing means are positioned about the said movable plunger. The plunger and coils, which together constitute pulsation sensing means, coact electrically to vary the inductance which is variable in accordance with the displacement of the plunger, so that the variation of inductance can be measured by means of a bridge.

Fig. 2 shows a different mechanical embodiment of the invention in which the pressure sensing means for detecting the pressure applied by the cylinder 22 to the eyeball is indicated by electromagnetic means, and the pulsation of the cornea is transmitted to electrical pulsation sensing means in the form of a piezo crystal 17 through an air chamber 30 and an air passage 29 so that the amplitude of pulsation is indicated by piezo electricity. The air chamber and air passage together form pressure displaceable means.

In Fig. 1, an eyeball of the person whose blood pressure is to be examined is indicated at 1, and the cornea at 2. A cylinder 3 applies pressure to the eyeball, and a plunger 4 is supported inside of the cylinder 3 and moves freely in the longitudinal direction thereof. The greater part of the plunger is made of a non-magnetic substance, but a part 5 thereof is made of a magnetic substance. Two coils 6 and 7 are placed about the said movable plunger 4. An expansible chamber shown here as a rubber balloon 8, is inserted between a stand 9 and the cylinder 3, which chamber is connected to an air pump 10. By the expansion of the balloon into which air is pumped from the air pump, the cylinder 3 is made to abut the eyeball. A pressure meter which indicates the pressure within the balloon is shown at 11, and means for amplifying and indicating the pulsations is provided in the form of a 1000 cycle oscillator at 12, a variable resistance 13 which forms a bridge together with coils 6 and 7 and which adjusts the balance thereof and an amplifier 14. The output of the oscillator 12 is impressed on the bridge, and an unbalance voltage of the bridge resulting from the variation of inductance of the coils 6 and 7 is transmitted to the amplifier 14. The amplifier 14 is a vacuum tube amplifier which amplifies about 1000 cycles, and the output thereof is supplied to the amplitude indicator 15. In the normal state where no external pressure is applied to the eyeball, the pulsation of the central retinal artery causes a pulsation of the cornea of the eyeball which may be termed the rest value, but when the cylinder 3 is pressed to the eyeball 1 by pumping air to the balloon 8 by means of the air pump 10, the cornea begins to pulsate with a different characteristic value. As the movable plunger 4 lightly rests upon the cornea under the effect of gravity or under the effect of a small elastic connection, it takes up a vibrational displacement in the longitudinal direction of the cylinder when the cornea pulsates.

The magnetic portion 5 forming a part of the movable plunger alternately approaches coils 6 and 7, and alternately increases or decreases the inductance of the coils 6 and 7.

Therefore, if the bridge formed by the coils 6, 7 and the resistance 13 are adjusted at the balanced position before an external pressure is applied to the eyeball, the variation of inductance which follows the pulsation of the cornea is indicated by the amplifier 14 as an unbalanced output of the bridge. The input voltage of the amplifier 14 has the same frequency as the pulsation of cornea and has an amplitude which is proportional to the amplitude of the pulsation. The amplitude indicator 15, therefore, indicates the pulsation of cornea.

If desired, a recording instrument may be used as indicator 15 so that the output of the amplifier 14 can be self-recorded.

As the external pressure which is applied to the eyeball is increased gradually, the intra-ocular tension also increases. The branches of the ophthalmic artery, more especially of the central retinal artery, pulsate, which leads to the pulsation of the cornea. Since the pulsation of cornea is proportional to and due to the pulsation of central retinal artery, the amplitude of pulsation of central retinal artery, and therefore that of cornea, increases from a characteristic rest value, taken in the absence of external pressure, to a maximum value, when the external pressure is increased gradually beyond atmospheric pressure. If the external pressure is increased beyond a certain value of maximum amplitude of corneal pulsation, the amplitude of the pulsation of the cornea gradually decreases due to the decrease of blood flow, and thereafter drops down towards the characteristic value to indicate that the blood flow is being stopped. The outer pressure respectively corresponding to the said maximum value and to the characteristic or rest value which may be directly read by the pressure meter 11 and converted into intra-ocular tension respectively indicates the minimum and maximum blood pressure.

If the pressure of the movable plunger applied to the cornea is properly selected in the embodiment of the Fig. 1, and if the output of the amplifier 14 is rectified, the direct current component thereof can be taken as a measure of the outer pressure, and the Ripple component thereof can be taken as measure of the pulsation. Also, if the said direct current component and the Ripple component are recorded on a plane by using the rectangular coordinates, the relation between the outer pressure and the pulsation can directly be indicated. Clinically, this is extremely important.

In Fig. 2, a diaphragm for receiving the pressure variation of the air chamber caused by the pulsation of the cornea, and which is made of duralumin foil, is indicated at 16, and a piezo crystal of Rochelle salt or the like for receiving the pressure from the diaphragm 16 is shown at 17. At 18, a spring made of piano wire or of Phosphor bronze wire for the application of outer pressure is indicated, and a spring for balancing of the spring 18 is shown at 19. A flange 31 is positioned between the springs and is attached to cylinder 26. A coil 20 for measuring external pressure is provided and a magnetic piece 21, for example a permalloy piece, is provided on the side wall of the cylinder 26. The inductance of the said coil is varied by the relative displacement of the said magnetic piece 21 which corresponds to the external pressure, so that the external pressure may be indicated. The end 22 of the cylinder to which the eyeball is abutted is made of a plastic such as acrylate resin. A flexible lead wire for leading out the piezo output is shown at 23, and a flexible lead wire for the coil 20 at 24. A handle 25 is connected to the outer case 27 for applying pressure, and at its inner side connects the flexible wires 23 and 24 with the cable 28 which leads to the indicator. At the inside of the cylinder 26 for applying pressure and indicating pulsation, an air passage 29 is provided between the end 22 and the diaphragm 16, as shown on the drawing. The air chamber 30 is formed at the part of the air passage 29 near the eyeball.

When the end 22 is pressed against the eyeball and pressed by the handle 25, the outer case 27 is pressed down, and the spring 18 presses down the flange 31 provided on the cylinder 26, thereby applying external pressure to the eyeball. Then, the coil 20 provided on a part of the outer case 27 approaches the magnetic piece placed on the side wall of the cylinder, the outer case 27 moves down, and the inductance value of the coil is varied. Since the external pressure applied to the eyeball is proportional to the displacement of the spring 18, and to the lowering of the outer case 27, the degree of displacement of the inductance of coil 20 can be taken as measure of the external pressure given to the eyeball, and the pressure can be directly read by a proper indicator connected to coil 20 through a lead wire 24.

Thus, when the pulsation of cornea rises due to the increase of external pressure, the air chamber 30 and the air pressure 29 form together an air chamber which is limited by the cornea and the plate 16. The pulsation of the cornea gives to the air in this air chamber a vibration having an amplitude and frequency which is proportional to the pulsation of the cornea. The diaphragm 16, therefore, vibrates due to the vibration of air, and induces in the Rochelle salt crystal 17 a voltage corresponding to said vibration. The output of the Rochelle salt crystal indicates the pulsation of the cornea.

As in the case of Fig. 1, the amplitude of pulsation reaches its maximum value as the pressure is increased by means of pressure exerted on the handle 25, and thereafter it goes down again to the characteristic rest value. Therefore, the minimum and maximum blood pressure can be measured by the indication of variation of inductance of coil and by the output voltage of the Rochelle salt crystal 17, as is also the case in Fig. 1.

In the embodiment of Fig. 2, a piezo crystal is used to catch the pulsation of cornea. However, other known means for converting mechanical vibration into electrical energy may be used, such as a static condenser or an electro magnetic pickup, etc.

What is claimed is:

1. An instrument for measuring intra-cerebral blood pressure by the application of external pressure to the eyeball of the eye which detects the characteristic pulsations of the central retinal artery and the changes in corneal pulsation upon the application of external pressure to the eyeball, comprising pressure applying means positionable over and in contact with the eyeball in spaced relation to the cornea, pressure sensing means connected to said pressure applying means, pressure displaceable means arranged to coact with the pulsations of the cornea, electrical pulsation sensing means to which said pressure displaceable means is connected, and indicating means connected to said electrical sensing means for indicating the degree of displacement of said pressure displaceable means.

2. An instrument as claimed in claim 1 in which said pressure displaceable means comprises a movable plunger which rests on the cornea, whereby corneal pulsations are transmitted directly thereto.

3. An instrument as claimed in claim 1 in which said pressure applying means is an inflatable chamber and a source of fluid under pressure connected thereto and a cylinder having a cup on the end thereof of a size to fit over the cornea and spaced therefrom with the edge of said cup resting on the eyeball in spaced relation to the cornea, said pressure sensing means is a fluid pressure meter, said pressure displaceable means comprises a movable plunger which rests on the cornea and is positioned in said cylinder which rests on the eyeball, and said electrical pulsation sensing means comprises at least two inductance coils surrounding said movable plunger, a variable resistance to which said coils are connected to form a bridge, an oscillator the output of which is impressed on said bridge, and an amplifier to which said bridge is connected.

4. An instrument as claimed in claim 3, and recording means connected to said amplifier to provide a direct recorded reading of the pulsation of the cornea.

5. An instrument as claimed in claim 1 in which said pressure displaceable means comprises a column of air in direct contact with the cornea, whereby corneal pulsations are transmitted directly to said column.

6. An instrument as claimed in claim 1 in which said pressure applying means comprises a cylinder having a cup on one end thereof of a size to fit over the cornea in spaced relation thereto with the edge of said cup resting on the eyeball in spaced relation to the cornea, an outer casing surrounding said cylinder having spring means therein acting on said cylinder and a handle on said casing, said pressure sensing means comprises an inductance coil on the interior of said casing, and a magnetic portion on said cylinder adjacent said inductance coil, said electrical pulsation sensing means comprises a piezo crystal over the opposite end of said cylinder from said cup, a spring balanced diaphragm mechanically connected to said piezo crystal and the column of air defined by said cup, the interior of said cylinder and said diaphragm comprising said pressure displaceable means, and means connected to said inductance coil and said piezo crystal for simultaneously measuring the variations in output of said piezo crystal and the variation in the relative position of said inductance coil and said magnetic portion.

7. An instrument as claimed in claim 6, and recording means connected to said piezo crystal and said inductance coil to provide a direct recording reading of the pulsation of the cornea and the pressure applied to the eyeball.

References Cited in the file of this patent

UNITED STATES PATENTS

| | | |
|---|---|---|
| 1,874,982 | Hansell | Aug. 30, 1932 |
| 2,139,509 | Marcellus | Dec. 6, 1938 |
| 2,415,310 | Summerville et al. | Feb. 4, 1947 |
| 2,519,681 | Mages | Aug. 22, 1950 |

FOREIGN PATENTS

| | | |
|---|---|---|
| 469,703 | Germany | Dec. 28, 1928 |
| 680,130 | Great Britain | Oct. 1, 1952 |